United States Patent
Perkins et al.

(10) Patent No.: US 8,464,461 B1
(45) Date of Patent: *Jun. 18, 2013

(54) INTELLIGENT STRIKE INDICATOR

(76) Inventors: James Perkins, Yukon, OK (US); Lorin Jacobson, Pauls Valley, OK (US); Lucas Jacobson, Claremore, OK (US); Patrick Williams, Oklahoma City, OK (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/488,274

(22) Filed: Jun. 19, 2009

Related U.S. Application Data

(63) Continuation of application No. 11/967,922, filed on Dec. 31, 2007, now Pat. No. 7,562,488.

(51) Int. Cl.
 *A01K 97/12* (2006.01)
(52) U.S. Cl.
 USPC .................................. 43/17; 43/4.5
(58) Field of Classification Search
 USPC ...................................... 43/17, 4.5
 See application file for complete search history.

(56) References Cited

U.S. PATENT DOCUMENTS

| | | | | | |
|---|---|---|---|---|---|
| 2,145,929 | A | * | 2/1939 | Herman | 43/17 |
| 3,453,766 | A | * | 7/1969 | Hunt et al. | 43/17 |
| 3,624,689 | A | * | 11/1971 | Rizzo | 43/17 |
| 4,026,059 | A | * | 5/1977 | Ochs | 43/17.5 |
| 4,051,616 | A | * | 10/1977 | Mathauser | 43/17 |
| 4,085,437 | A | * | 4/1978 | Hrdlicka et al. | 43/17.5 |
| 4,114,305 | A | * | 9/1978 | Wohlert et al. | 43/17.6 |
| 4,117,618 | A | * | 10/1978 | Utsler | 43/17.5 |
| 4,246,716 | A | * | 1/1981 | Elmer | 43/17 |
| 4,276,711 | A | * | 7/1981 | Mathauser | 43/17 |
| 4,418,489 | A | * | 12/1983 | Mathauser | 43/17 |
| 4,466,211 | A | * | 8/1984 | Mathauser | 43/17 |
| 4,586,284 | A | * | 5/1986 | Westwood, III | 43/17 |
| 4,693,125 | A | * | 9/1987 | Krutz et al. | 43/17 |
| 4,748,761 | A | * | 6/1988 | Machovina | 43/17 |
| 4,775,920 | A | * | 10/1988 | Seibert et al. | 43/17.5 |
| 5,010,678 | A | * | 4/1991 | Peck et al. | 43/17 |
| 5,063,373 | A | * | 11/1991 | Lindsley | 43/17 |
| 5,083,247 | A | * | 1/1992 | Robinson et al. | 43/17.5 |
| 5,097,618 | A | * | 3/1992 | Stoffel | 43/17 |
| 5,172,508 | A | * | 12/1992 | Schmidt et al. | 43/17.5 |
| 5,182,873 | A | * | 2/1993 | Aragon, Jr. | 43/17 |
| 5,228,228 | A | * | 7/1993 | Meissner | 43/17 |
| 5,274,943 | A | * | 1/1994 | Ratcliffe et al. | 43/17 |

(Continued)

FOREIGN PATENT DOCUMENTS

| | | |
|---|---|---|
| DE | 19843144 | 2/2000 |
| DE | 19843144 C1 * | 2/2000 |

(Continued)

*Primary Examiner* — Darren W Ark

(74) *Attorney, Agent, or Firm* — Head, Johnson & Kachigian, P.C.

(57) ABSTRACT

A strike indicator that indicates when a fish bites and reduces false positives, comprising a light source, a power source, a printed circuit board, an accelerometer integrated circuit mounted on said printed circuit board, and a microcontroller mounted on said printed circuit board. The strike indicator may be housed in a fishing rod, with the light source illuminating the tip of the rod. The accelerometer detects acceleration of the rod, and the microcontroller utilizes an algorithm to determine whether the acceleration is due to a fish biting or due to other causes. If the acceleration is due to a fish biting, the light source is activated, alerting the user that a fish is biting.

20 Claims, 4 Drawing Sheets

U.S. PATENT DOCUMENTS

| | | | |
|---|---|---|---|
| 5,526,601 A * | 6/1996 | Onuma et al. | 43/17 |
| 5,570,532 A * | 11/1996 | Shaffer et al. | 43/17 |
| 5,581,930 A * | 12/1996 | Langer | 43/17 |
| 5,669,175 A * | 9/1997 | Phipps | 43/17 |
| 5,738,433 A * | 4/1998 | Sparks | 43/17.5 |
| 5,826,366 A * | 10/1998 | Matibe | 43/17.5 |
| 5,833,156 A * | 11/1998 | Park et al. | 43/4 |
| 5,894,691 A * | 4/1999 | Zepeda, Sr. | 43/17 |
| 6,061,946 A * | 5/2000 | Toelken | 43/17 |
| 6,354,036 B1 * | 3/2002 | Carlson et al. | 43/17 |
| 6,374,533 B1 * | 4/2002 | Gonzales | 43/17 |
| 6,393,753 B1 * | 5/2002 | Walker | 43/17 |
| 6,578,312 B1 * | 6/2003 | Artz | 43/17.5 |
| 6,584,722 B1 * | 7/2003 | Walls et al. | 43/4.5 |
| 6,594,942 B1 * | 7/2003 | Sherwood et al. | 43/17.5 |
| 6,708,441 B2 * | 3/2004 | Dirito | 43/17 |
| 6,758,006 B1 * | 7/2004 | Walls et al. | 43/4.5 |
| 6,765,155 B1 * | 7/2004 | Gray | 43/4 |
| 6,789,348 B1 * | 9/2004 | Kneller et al. | 43/17 |
| 6,966,140 B1 * | 11/2005 | Rozkowski | 43/17 |
| 7,003,912 B1 * | 2/2006 | Morgan et al. | 43/17 |
| 7,021,140 B2 * | 4/2006 | Perkins | 73/493 |
| 7,040,052 B1 * | 5/2006 | Paulk | 43/17 |
| 7,131,231 B1 * | 11/2006 | Lee | 43/17 |
| 7,140,144 B1 * | 11/2006 | Morgan et al. | 43/17 |
| 7,322,253 B2 * | 1/2008 | Owens | 43/17 |
| 7,343,261 B1 * | 3/2008 | Kell | 43/17 |
| 7,562,488 B1 * | 7/2009 | Perkins et al. | 43/17 |
| 7,779,573 B2 * | 8/2010 | Pekin | 43/17 |
| 7,934,338 B2 * | 5/2011 | Hope | 43/17 |
| 8,336,248 B2 * | 12/2012 | Miškatovi | 43/17 |
| 2004/0055204 A1 * | 3/2004 | Allie | 43/18.1 R |
| 2004/0159039 A1 * | 8/2004 | Yates et al. | 43/17.5 |
| 2005/0166411 A1 * | 8/2005 | Scorvo | 33/471 |
| 2005/0193616 A1 * | 9/2005 | Johnson | 43/17 |
| 2005/0200836 A1 * | 9/2005 | Scorvo | 356/138 |
| 2006/0117638 A1 * | 6/2006 | Park | 43/17 |
| 2006/0117639 A1 * | 6/2006 | Jones | 43/17 |
| 2006/0162451 A1 * | 7/2006 | Perkins | 73/511 |
| 2006/0265931 A1 * | 11/2006 | Mcfadden et al. | 43/17 |
| 2007/0220799 A1 * | 9/2007 | Burns, III | 43/23 |
| 2007/0277424 A1 * | 12/2007 | Hale et al. | 43/17 |
| 2007/0283612 A1 * | 12/2007 | Shaw et al. | 43/17 |
| 2008/0000138 A1 * | 1/2008 | Cummings | 43/18.1 R |
| 2008/0016749 A1 * | 1/2008 | Priednieks | 43/20 |
| 2008/0066367 A1 * | 3/2008 | Meeks et al. | 43/17 |
| 2008/0174550 A1 * | 7/2008 | Laurila et al. | 345/158 |
| 2008/0250691 A1 * | 10/2008 | Barnes et al. | 43/17 |
| 2009/0158635 A1 * | 6/2009 | Hope | 43/17 |
| 2010/0000143 A1 * | 1/2010 | Pekin | 43/17 |
| 2011/0067290 A1 * | 3/2011 | Miskatovic | 43/17 |

FOREIGN PATENT DOCUMENTS

| | | | |
|---|---|---|---|
| EP | 384681 | | 8/1990 |
| EP | 384681 A1 | * | 8/1990 |
| FR | 2603774 | | 3/1988 |
| FR | 2603774 A1 | * | 3/1988 |
| FR | 2657752 | | 8/1991 |
| FR | 2657752 A1 | * | 8/1991 |
| FR | 2667218 | | 4/1992 |
| FR | 2667218 A1 | * | 4/1992 |
| GB | 2052231 | | 1/1981 |
| GB | 2052231 A | * | 1/1981 |
| GB | 2191372 | | 12/1987 |
| GB | 2191372 A | * | 12/1987 |
| GB | 2196222 | | 4/1988 |
| GB | 2196222 A | * | 4/1988 |
| GB | 2219181 | | 12/1989 |
| GB | 2219181 A | * | 12/1989 |
| GB | 2222060 | | 2/1990 |
| GB | 2222060 A | * | 2/1990 |
| GB | 2244195 | | 11/1991 |
| GB | 2244195 A | * | 11/1991 |
| GB | 2315971 | | 2/1998 |
| GB | 2315971 A | * | 2/1998 |
| GB | 2394876 | | 5/2004 |
| GB | 2394876 A | * | 5/2004 |
| JP | 63309125 A | * | 12/1988 |
| JP | 01296932 A | * | 11/1989 |
| JP | 04222535 | | 8/1992 |
| JP | 04222535 A | * | 8/1992 |
| JP | 05244846 | | 9/1993 |
| JP | 05244846 A | * | 9/1993 |
| JP | 08140545 | | 6/1996 |
| JP | 08140545 A | * | 6/1996 |
| JP | 63309125 | | 12/1998 |
| JP | 2000004748 | | 1/2000 |
| JP | 2000004748 A | * | 1/2000 |
| JP | 2001128606 | | 5/2001 |
| JP | 2001128606 A | * | 5/2001 |
| JP | 2001299156 | | 10/2001 |
| JP | 2001299156 A | * | 10/2001 |
| JP | 2004201559 | | 7/2004 |
| JP | 2004201559 A | * | 7/2004 |
| JP | 2008092923 | | 4/2008 |
| JP | 2008092923 A | * | 4/2008 |
| WO | WO9313655 | | 7/1993 |
| WO | WO 9313655 A1 | * | 7/1993 |
| WO | WO9533371 | | 12/1995 |
| WO | WO 9533371 A1 | * | 12/1995 |
| WO | WO2004064515 | | 8/2004 |
| WO | WO 2004064515 A1 | * | 8/2004 |

* cited by examiner

INTELLIGENT STRIKE INDICATOR

CROSS-REFERENCE TO RELATED APPLICATIONS

This application claims priority to and is a continuation application of U.S. patent application Ser. No. 11/967,922, filed Dec. 31, 2007, now U.S. Pat. No. 7,562,488, which is incorporated herein by reference.

BACKGROUND OF THE INVENTION

1. Field of the Invention

This invention relates generally to fishing equipment, and more specifically to a device and method utilizing an intelligent strike indicator that indicate when a fish bites.

2. Description of the Related Art

Fishing at night is difficult because the angler cannot see the tip of the fishing pole to determine when a fish is biting. Therefore, there have been many devices created that indicate when a fish bites. These devices usually detect tension in the fishing line or motion of the fishing pole, or may contain a circuit that closes when the fishing pole is flexed. When a triggering event occurs, the device produces a light or a sound to alert the user that a fish is biting. However, these devices do not differentiate between a fish biting and other causes of line tension or pole motion, such as snags, wind, and waves, other than simple threshold detection. Additionally, these devices do nothing to show that a strike occurred in the past. Furthermore, the type of device that detects line tension may interfere with the function of the fishing line.

Based on the foregoing, there is a need for an intelligent strike indicator that does not impede the function of the fishing line and that filters out false positives so that it signals the user only when a fish bites.

SUMMARY OF THE INVENTION

In general, in a first aspect, the invention relates to a strike indicator for indicating when a fish bites, comprising a fishing rod, a light source, a power source, a printed circuit board, an accelerometer integrated circuit mounted on the printed circuit board, and a microcontroller mounted on the printed circuit board. Capacitors may also be mounted on the printed circuit board. The light source may be a light emitting diode, and the power source may be two 1.5 volt batteries. The strike indicator may also comprise a radio transmitter and a remote handheld device that receives and analyzes transmissions from the transmitter.

The strike indicator may be housed internally within the fishing rod, which may have a transparent or translucent rod tip. The rod tip may be designed to maximize light output from an internal source. The power source may be housed within the fishing rod. The strike indicator may also be capable of being installed externally on the fishing rod. The strike indicator may be located within an external housing mounted on the tip of the fishing rod. The external housing may comprise a transparent or translucent portion such that the light source within the external housing may be seen when illuminated. Additionally, the strike indicator may be housed in a fishing bobber. The strike indicator filters out false positives.

In general, in a second aspect, the invention relates to a method of indicating when a fish bites includes the steps of providing a fishing rod with the strike indicator, detecting acceleration on the rod, beginning an algorithm to determine whether the acceleration is due to a fish biting, where the algorithm filters out false positives, and activating the light source if the microcontroller determines that a fish is biting. The algorithm may comprise one or more of the following steps: (1) determining whether a strike occurred state is set to true, where the strike occurred state set to true indicates that a strike previously occurred and the strike occurred state was set to true pursuant to this algorithm; (2) if the strike occurred state is set to true, activating the light source with a flash rate that indicates how much time has passed since the strike occurred; (3) regardless of whether the strike occurred state is set to true or false, determining whether a change in acceleration has occurred; (4) if a change in acceleration has not occurred, entering a timed sleep mode; (5) if a change in acceleration has occurred, taking multiple samples of accelerations and adding them to a buffer and proceeding to determine whether a certain percentage of accelerations in the buffer is large enough to indicate a cast; (6) if a certain percentage of accelerations in the buffer is large enough to indicate a cast, deactivating the light source, ignoring future accelerations for a certain length of time, setting the strike occurred state to false, and entering a timed sleep mode; (7) if a certain percentage of accelerations in the buffer is not large enough to indicate a cast, determining whether the angle, of the fishing rod has changed by calculating the angle of gravity; (8) if the angle of the fishing rod has changed, setting the strike occurred state to true and entering a timed sleep mode; (9) if the angle of the fishing rod has not changed, determining whether the acceleration is non-decaying and periodic; (10) if the acceleration is non-decaying and periodic, entering a timed sleep mode; and (11) if the acceleration is not periodic or is periodic and decaying, setting the strike occurred state to true and entering a timed sleep mode.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the components and steps without departing from the spirit and scope of this disclosure. It is understood that the devices and methods are not limited to the embodiments set forth herein for purposes of exemplification, but are to be limited only be the scope of the claims, including the full range of equivalency to which each element thereof is entitled.

During use, the intelligent strike indicator senses when a fish is biting and analyzes whether it is a true strike or a false positive. Once the intelligent strike indicator rules out false positives, it causes a light emitting diode to illuminate, indicating to the user that a fish is biting.

Figure 1:
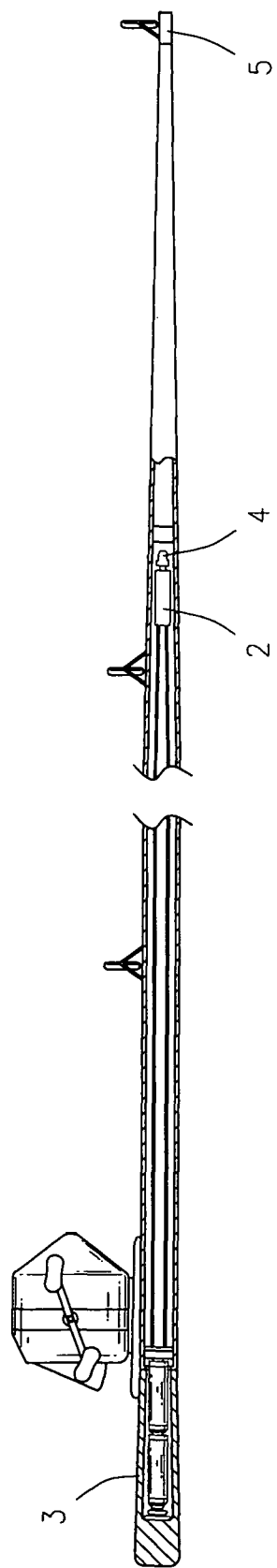
FIG. 1 is a cut away view of an example of a fishing rod with an intelligent strike indicator housed therein in accordance with an illustrative embodiment of the intelligent strike indicator disclosed herein.

As seen in FIG. 1, the strike indicator may be housed internally in a fishing rod 1. A printed circuit board 2 may be located inside the rod 1. A power source 3 for the strike indicator may be located in the rod blank. The strike indicator includes a light source 4. The tip 5 of the fishing rod 1 may be made of translucent or transparent material to allow the light source 4 to be seen when activated. The light source 4 may be a light emitting diode and the power source 3 may be two 1.5 volt batteries.

Figure 2:
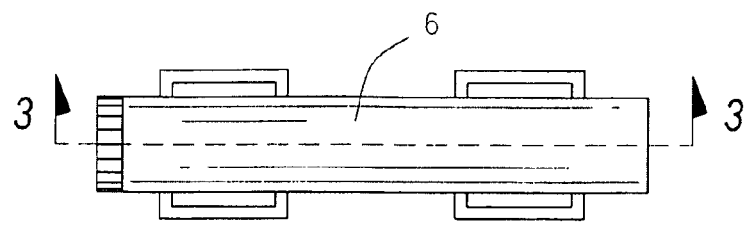
FIG. 2 is an exterior view of an example of an intelligent strike indicator housed in an external unit that may be mounted to a fishing rod in accordance with an illustrative embodiment of the intelligent strike indicator disclosed herein.
Figures 3, 4:
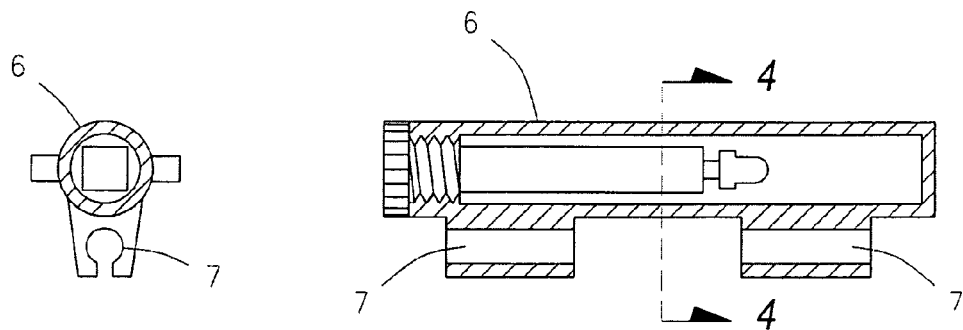
FIG. 3 is a cut away view of the intelligent strike indicator of FIG. 3.
FIG. 4 is a cross section of the intelligent strike indicator of FIG. 4.
Figure 5:
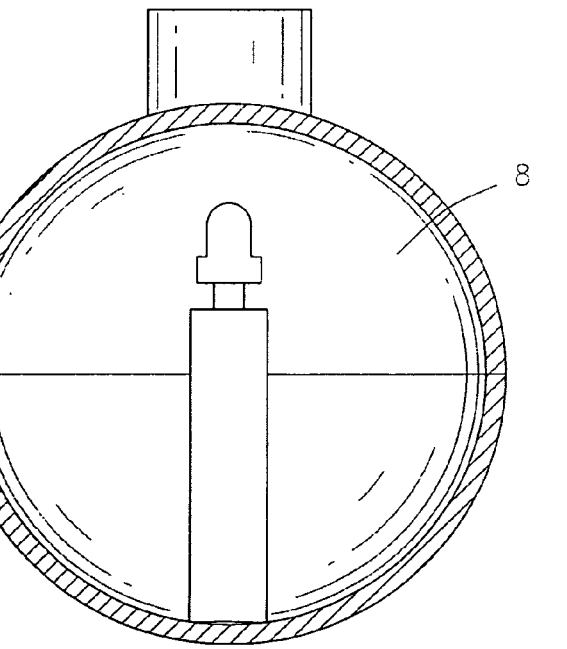
FIG. 5 is a cut away view of an example of a bobber float with an intelligent strike indicator housed therein in accordance with an illustrative embodiment of the intelligent strike indicator disclosed herein.

As seen in FIGS. 2, 3, and 4, the strike indicator may be located within an external housing 6, which may be mounted on a fishing rod via attached means 7 of mounting the housing 6 on a rod. Alternately, the strike indicator may be located within a bobber 8, as seen in FIG. 5.

Figure 6:
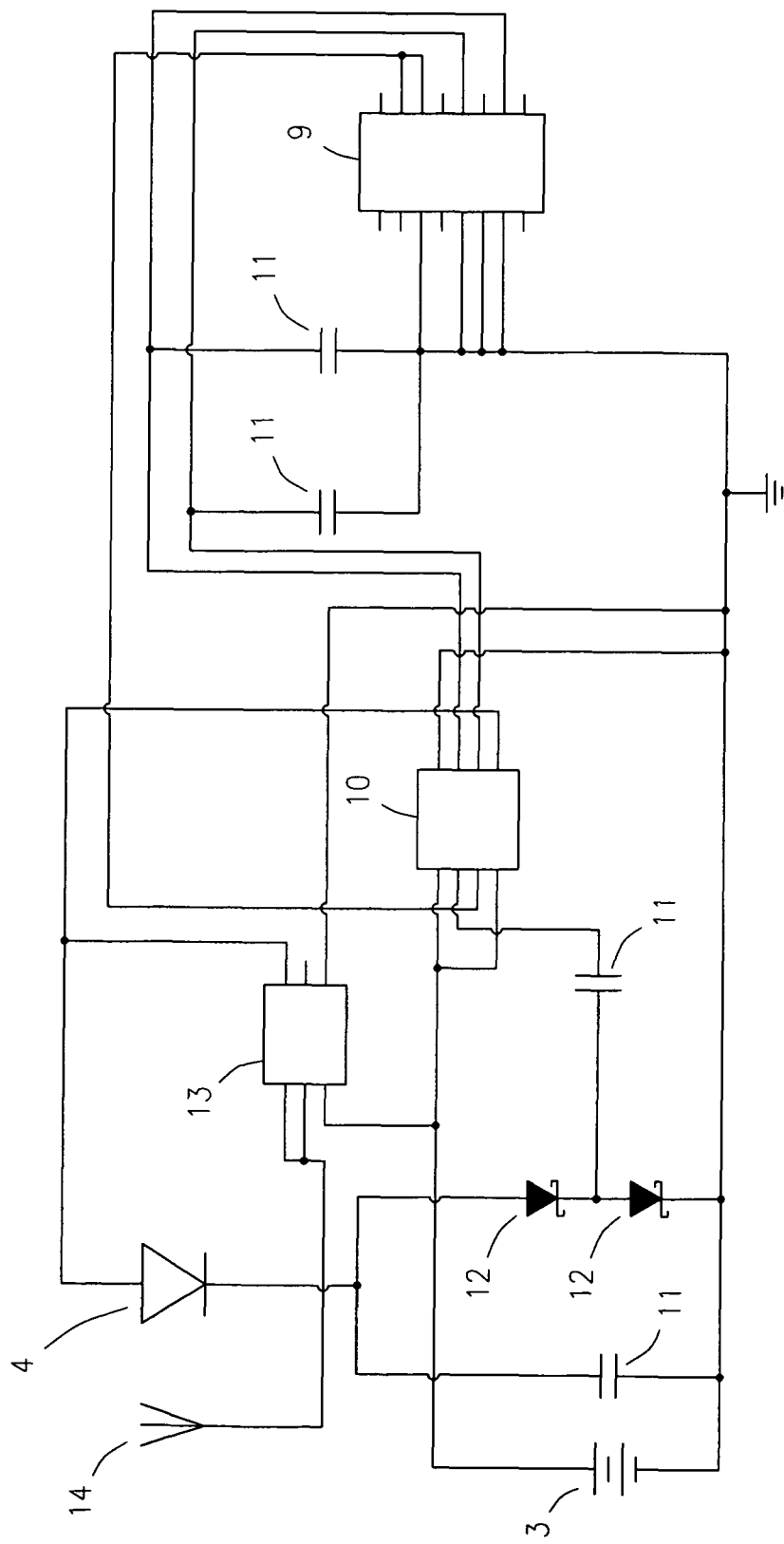
FIG. 6 is a circuit diagram illustrating an example of the circuitry of an intelligent strike indicator in accordance with an illustrative embodiment of the intelligent strike indicator disclosed herein.

FIG. 6 is a circuit diagram illustrating the circuitry of the strike indicator. Mounted on the printed circuit board 2 are an accelerometer 9 and a microcontroller 10. Also mounted on the printed circuit board 2 may be capacitors 11. The accelerometer 9 may be a two or three axis digital or analog accelerometer. Furthermore, the accelerometer 9 may be a high sensitivity accelerometer. The microcontroller 10 may have an analog to digital converter. The microcontroller 10 may also have a serial interface to interface with the accelerometer 9. The strike indicator may also comprise two schottky diodes 12 as part of a charge pump to allow the use of only two batteries to power the light source 4 instead of three. The strike indicator may additionally comprise a radio transmitter/microcontroller combo 13 and an antenna 14.

When the strike indicator also comprises a radio transmitter/microcontroller combo 13, the transmitter communicates with a handheld device to allow remote monitoring of the fishing equipment. The wireless system may include a Zigbee protocol or other wireless mesh networking stack to allow equipment far from the user to use other equipment as repeating stations to increase communication distance. Within this protocol channel, information may be included so that each angler has monitoring capability only over his equipment. This prevents cross talk between multiple anglers using the wireless equipment. The protocol may also contain indicator information data so that when multiple strike indicators are used with the same handheld device, the user will be able to distinguish on which piece of equipment the strike is occurring. This data may include both device type data and device number identifier. The protocol may also contain strength of strike information, which will be displayed on the handheld as well.

The strike indicator detects movement of the fishing rod and determines whether the movement fits the criteria of a fish biting. If so, the light source is activated, signaling to a user that a fish is biting. The intelligent strike indicator utilizes the accelerometer integrated circuit and the microcontroller integrated circuit to rule out false positives. The indicator works by detecting movement of the fishing rod tip and comparing that movement to typical fish-strike movement. There are a few characteristic signals that are indicative of a fish strike. First, a large sudden strike by a fish will register as a large quick acceleration on the rod tip that is larger than any other stimuli other than the cast motion. This would be a large enough change in acceleration to initiate the start of the algorithm upon the next sample. Second, a light strike could conceivably be of smaller magnitude than wind or waves, but would still cause a greater change in acceleration because the strike would pose a significantly higher frequency than wind or waves. Therefore, this would trigger the algorithm. Lastly, a fish slowly pulling away causes the rod angle to change with respect to Earth's gravity. This would show a change in acceleration that would trigger the algorithm. Once the algorithm begins, more data is taken to further analyze the stimulus to determine whether the source is actually from a fish. This is done by canceling out signals that are periodic and non-decaying as well as calculating the angle of gravitational pull.

Figure 7:
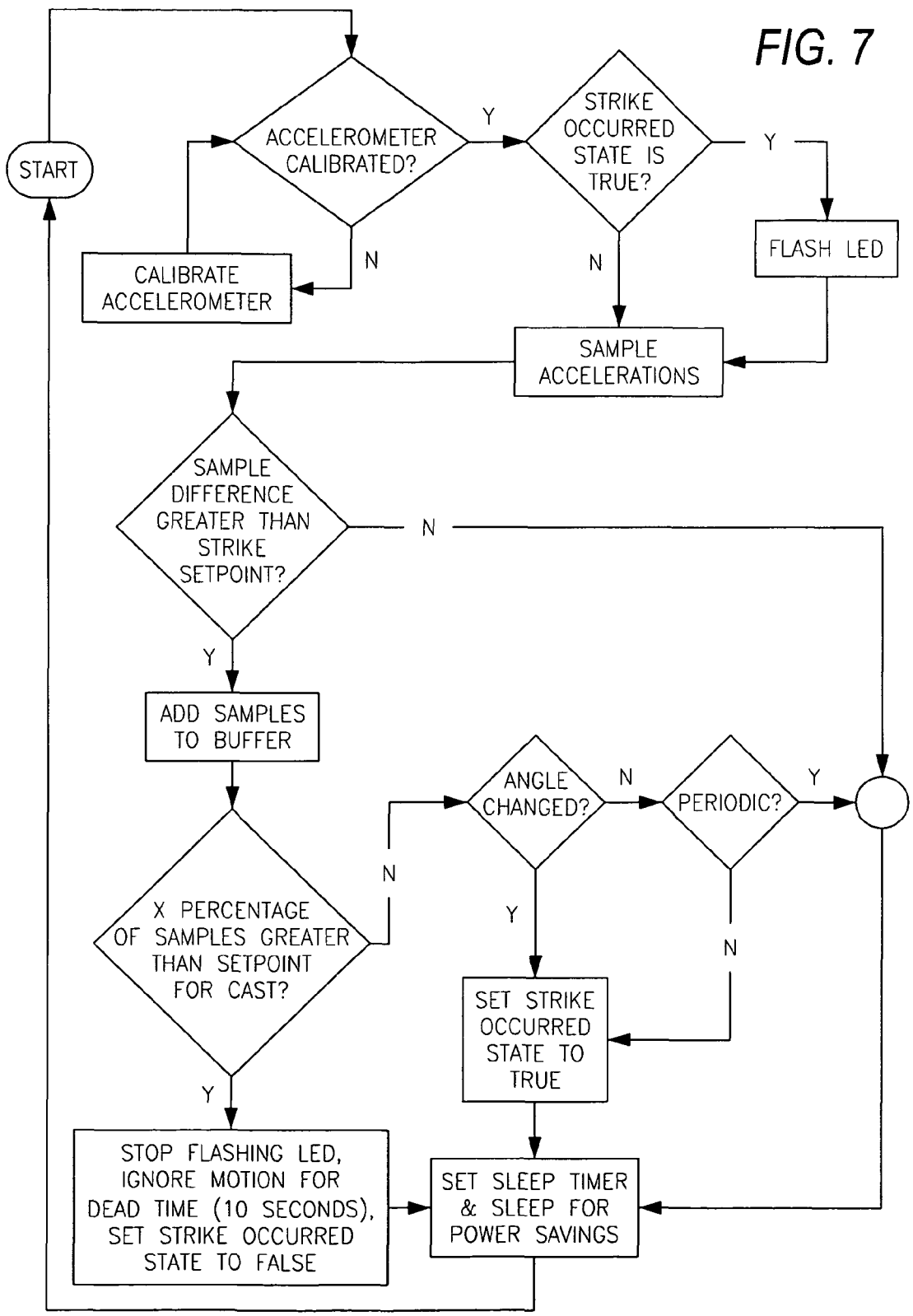
FIG. 7 is a flow chart illustrating an example of the method by which the intelligent strike indicator filters out false positives in accordance with an illustrative embodiment of the intelligent strike indicator disclosed herein.

FIG. 7 is a flow chart illustrating the method by which the intelligent strike indicator filters out false positives. The first step is to determine whether the accelerometer is calibrated. If not, the next step is to calibrate the accelerometer and repeat the first step. If the accelerometer is calibrated, the next step is to determine whether a strike occurred state is true, which indicates that a strike previously occurred and the strike occurred state was set to true pursuant to this algorithm. If the strike occurred state is true, the light source is activated. The light may flash rapidly at first, then with decreased frequency as time passes to indicate to the user how long it has been since the strike.

After determining the strike occurred state, the microprocessor determines whether the acceleration detected by the accelerometer is greater than a given strike setpoint. If not, the strike indicator enters a timed sleep mode for power savings. If the acceleration is greater than the given strike setpoint, a number of samples are taken and placed in a buffer for processing. The microprocessor then determines whether a certain percentage of the samples in the buffer are greater than a value that would indicate a cast. A cast is characterized by a long-term, large, continuous acceleration. The purpose of this step is to eliminate accelerations caused by casting and to reset the device and the strike occurred state. If a cast is determined to have occurred, the microcontroller deactivates the light source, ignores all motion for a given time (such as 10 seconds) to allow the angler to place the rod, and sets the strike occurred state to false. The strike indicator then enters a timed sleep mode.

If the samples are not greater than the setpoint for a cast, the microcontroller determines whether the angle of the rod has changed. If so, this indicates a fish is biting and the strike occurred state is set to true, and the strike indicator enters a timed sleep mode. If not, the microcontroller determines whether the acceleration is periodic and non-decaying. If so, this indicates that the motion is due to a source other than a fish biting, such as waves, the motion of a boat, etc. Therefore, the strike indicator enters a timed sleep mode. However, if the acceleration is not periodic or is decaying, this indicates a fish is biting, and the strike occurred state is set to true before the strike indicator enters a timed sleep mode. In the instances where the strike occurred state has been set to true, the light source will be activated when the device wakes from timed sleep and the algorithm begins again.

When the intelligent strike indicator has determined that a fish is biting, it causes the light source to illuminate. Additionally, it may cause a buzzer to sound and/or send a radio signal to a handheld device that alerts the user to the strike.

The light may blink quickly when the strike is first detected, then blink with decreased frequency as a function of time in order to indicate the duration of time that has elapsed since the strike. If the intelligent strike indicator has a handheld sensor, the sensor displays the time that has elapsed since the strike.

Whereas, the devices and methods have been described in relation to the drawings and claims, it should be understood that other and further modifications, apart from those shown or suggested herein, may be made within the spirit and scope of this invention.

What is claimed is:

1. A method of indicating when a fish bites, said method comprising the steps of:
   providing a strike indicator for a fishing rod for indicating a fish bite while fishing, said strike indicator comprising:
      a power source;
      a printed circuit board;
      an accelerometer integrated circuit mounted on said printed circuit board; and
      a microcontroller mounted on said printed circuit board;
   detecting directly on said fishing rod a change in spatial orientation and/or position over a period of time using said strike indicator,
   beginning an algorithm with said strike indicator to determine whether said change in spatial orientation and/or position is due to said fish bite, where said algorithm filters out false positives, where said algorithm comprises the steps of:
      1) taking samples of acceleration data;
      2) adding said samples of acceleration data to a buffer; and
      3) determining whether said samples of acceleration data indicate a change in spatial orientation and/or position that is non-decaying and/or periodic; and
   activating a detectable output signal if said algorithm determines said fish bite.

2. The method of claim 1 where said algorithm further comprises the steps of:
   determining whether a strike occurred state is set to true, where said strike occurred state set to true indicates that a strike previously occurred and said strike occurred state was set to true pursuant to said algorithm; and
   if said strike occurred state is set to true, activating said detectable output signal.

3. The method of claim 1 where said algorithm further comprises the steps of:
   1) detecting directly on said fishing rod a first state of spatial orientation and/or position of said fishing rod;
   2) subsequent to step 1, detecting directly on said fishing rod a second state of spatial orientation and/or position of said fishing rod;
   3) subsequent to step 2, determining whether said change in spatial orientation and/or position has occurred.

4. The method of claim 3 where said algorithm further comprises the steps of:
   if said change in spatial orientation and/or position has not occurred, entering a timed delay;
   if said change in spatial orientation and/or position has occurred, determining whether a certain percentage of said change in spatial orientations and/or positions is large enough to indicate a cast; and
   if said certain percentages of said change in spatial orientations and/or positions is large enough to indicate said cast, deactivating said detectable output signal, ignoring future change in spatial orientations and/or positions for a certain length of time, setting said strike occurred state to false, and entering a timed delay.

5. The method of claim 1 where said algorithm further comprises the steps of:
   determining whether an angle of said fishing rod has changed by calculating the angle of gravity; and
   if said angle of said fishing rod has changed, setting said strike occurred state to true and entering a timed delay.

6. The method of claim 1 where said algorithm further comprises the steps of:
   if said change in spatial orientation and/or position is non-decaying and periodic, entering a timed delay; and
   if said change in spatial orientation and/or position is not periodic or is periodic and decaying, setting a strike occurred state to true and entering said timed delay.

7. The method of claim 1 wherein said step of activating said detectable output signal further comprises the step of activating a light source at a rate that indicates how much time has passed since said light source began flashing.

8. A method of indicating when a fish bites, said method comprising the steps of:
   providing a strike indicator for a fishing rod for indicating a fish bite while fishing, said strike indicator comprising:
      a power source;
      a printed circuit board;
      an accelerometer integrated circuit mounted on said printed circuit board; and
      a microcontroller mounted on said printed circuit board;
   detecting directly on said fishing rod a first state of spatial orientation and/or position of said fishing rod with said strike indicator;
   subsequent to detecting said first state, detecting directly on said fishing rod a second state of spatial orientation and/or position of said fishing rod with said strike indicator;
   beginning an algorithm with said strike indicator to determine whether a change in spatial orientation and/or position between said first state and said second state is due to said fish bite, where said algorithm filters out false positives, where said algorithm comprises the step of determining whether said change in said spatial orientation and/or position between said first state and said second state has occurred, where said algorithm further comprises the steps of if said change in spatial orientation and/or position has occurred, taking multiple samples of change in spatial orientations and/or positions and adding said samples to a buffer; and
   activating a detectable output signal if said algorithm determines said fish bite.

9. The method of claim 8 where said algorithm further comprises the step of determining whether a certain percentage of said samples of change in spatial orientations and/or positions in said buffer is large enough to indicate a cast.

10. The method of claim 9 where said algorithm further comprises the steps if said certain percentages of said samples of change in spatial orientations and/or positions in said buffer is large enough to indicate said cast, deactivating said detectable output signal, ignoring future change in spatial orientations and/or positions for a certain length of time, setting said strike occurred state to false, and entering a timed delay.

11. The method of claim 8 where said algorithm further comprises the steps of:
   determining whether a strike occurred state is set to true, where said strike occurred state set to true indicates that a strike previously occurred and said strike occurred state was set to true pursuant to said algorithm; and
   if said strike occurred state is set to true, activating said detectable output signal.

12. The method of claim 8 where said algorithm further comprises the step of if said change in spatial orientation and/or position has not occurred, entering a timed delay.

13. The method of claim 8 where said algorithm further comprises the steps of:
   determining whether an angle of said fishing rod has changed by calculating the angle of gravity; and
   if said angle of said fishing rod has changed, setting said strike occurred state to true and entering a timed delay.

14. The method of claim 8 where said algorithm further comprises the steps of:
   determining whether said change in spatial orientation and/or position is non-decaying and periodic;
   if said change in spatial orientation and/or position is non-decaying and periodic, entering a timed delay; and
   if said change in spatial orientation and/or position is not periodic or is periodic and decaying, setting a strike occurred state to true and entering a timed delay.

15. The method of claim 8 wherein said step of activating said detectable output signal further comprises the step of activating a light source at a rate that indicates how much time has passed since said light source began flashing.

16. A method of indicating when a fish bites, said method comprising the steps of:
   providing a strike indicator for a fishing rod for indicating a fish bite while fishing, said strike indicator comprising:
      a power source;
      a printed circuit board;
      an accelerometer integrated circuit mounted on said printed circuit board; and
      a microcontroller mounted on said printed circuit board;
   detecting directly on said fishing rod a change in spatial orientation and/or position along multiple axes with respect to time using said strike indicator;
   beginning an algorithm with said strike indicator to determine whether said change in spatial orientation and/or position is due to said fish bite, where said algorithm filters out false positives, where said algorithm comprises the steps of:
      1) detecting directly on said fishing rod a first state of spatial orientation and/or position of said fishing rod;
      2) subsequent to step 1, detecting directly on said fishing rod a second state of spatial orientation and/or position of said fishing rod;
      3) subsequent to step 2, determining whether said change in said spatial orientation and/or position between said first state and said second state has occurred;
      4) if said change in said spatial orientation and/or position has occurred, setting a strike occurred state to true; and
      5) if said change in said spatial orientation and/or position has not occurred, entering a timed delay and then repeating steps 1) through 3) of said algorithm;
   where said strike occurred state set to true indicates that a strike previously occurred and said strike occurred state was set to true pursuant to said algorithm; and
   if said strike occurred state is set to true, activating a detectable output signal.

17. The method of claim 16 where said algorithm further comprises the steps of:
   if said change in spatial orientation and/or position has occurred, taking multiple samples of change in spatial orientations and/or positions and adding said samples to a buffer and proceeding to determine whether a certain percentage of said change in spatial orientations and/or positions in said buffer is large enough to indicate a cast; and
   if said certain percentages of said change in spatial orientations and/or positions in said buffer is large enough to indicate said cast, deactivating said detectable output signal, ignoring future change in spatial orientations and/or positions for a certain length of time, setting said strike occurred state to false, and entering a timed delay.

18. The method of claim 16 where said algorithm further comprises the steps of:
   determining whether an angle of said fishing rod has changed by calculating the angle of gravity; and
   if said angle of said fishing rod has changed, setting said strike occurred state to true and entering a timed delay.

19. The method of claim 16 where said algorithm further comprises the steps of:
   determining whether said change in spatial orientation and/or position is non-decaying and periodic;
   if said change in spatial orientation and/or position is non-decaying and periodic, entering a timed delay; and
   if said change in spatial orientation and/or position is not periodic or is periodic and decaying, setting said strike occurred state to true and entering said timed delay.

20. The method of claim 16 further comprising the step of activating said detectable output signal comprises activating a light source at a rate that indicates how much time has passed since said light source began flashing.

\* \* \* \* \*